(12) United States Patent
Zaroslov et al.

(10) Patent No.: US 7,151,078 B2
(45) Date of Patent: Dec. 19, 2006

(54) GELABLE LIQUID AND METHOD FOR SELECTIVELY INHIBITING THE GELATION OF A GELABLE LIQUID

(75) Inventors: Yury Dmitrievich Zaroslov, Moscow (RU); Olga Evgenievna Filippova, Moscow (RU); Inesa Vasilievna Blagodatskikh, Moscow (RU); Alexei Removich Khokhlov, Moscow (RU)

(73) Assignee: Schlumberger Technology Corporation, Ridgefield, CT (US)

( * ) Notice: Subject to any disclaimer, the term of this patent is extended or adjusted under 35 U.S.C. 154(b) by 300 days.

(21) Appl. No.: 10/340,444

(22) Filed: Jan. 10, 2003

(65) Prior Publication Data

US 2004/0072698 A1    Apr. 15, 2004

(30) Foreign Application Priority Data

Oct. 9, 2002    (RU) ............................... 2002126968

(51) Int. Cl.
 *C09K 8/00*    (2006.01)
(52) U.S. Cl. ...................... 507/225; 507/203; 507/219; 507/224; 507/921
(58) Field of Classification Search ................ 507/203, 507/219, 224, 225, 921
See application file for complete search history.

(56) References Cited

U.S. PATENT DOCUMENTS

| | | | |
|---|---|---|---|
| 3,783,944 A | 1/1974 | Jennings et al. ............. 166/274 |
| 4,735,731 A | 4/1988 | Rose et al. | |
| 5,551,516 A | 9/1996 | Norman et al. | |
| 6,194,356 B1 | 2/2001 | Jones et al. | |
| 6,232,274 B1 | 5/2001 | Hughes et al. | |
| 6,399,546 B1 * | 6/2002 | Chang et al. ............... 507/240 |
| 6,858,229 B1 * | 2/2005 | Hubbell et al. ............. 424/484 |
| 6,920,928 B1 * | 7/2005 | Davies et al. ............... 166/279 |
| 2002/0004464 A1 * | 1/2002 | Nelson et al. .............. 507/200 |

FOREIGN PATENT DOCUMENTS

| | | |
|---|---|---|
| GB | 2 213 850 A | 8/1989 |
| GB | 2 252 103 A | 7/1992 |
| GB | 2332223 B | 6/1999 |
| GB | 2335428 B | 9/1999 |
| WO | WO 99/49183 | 3/1999 |
| WO | WO 99/50530 A | * 10/1999 |

OTHER PUBLICATIONS

Hoffmann H. In Structure and Flow in Surfactant Solutions; ACS Symp. Ser. 578; Herb C.A., Prudhomme R., Eds. American Chemical Society: Washington, DC, 1994; pp. 2-31.

Rose, G. D. and Teot, A. S., "Viscoelastic Surfactants—Rheology control without polymers or particulates", In Structure and Flow in Surfactant Solutions; ACS Symp. Ser. 578; Herb C.A., Prudhomme R., Eds. American Chemical Society: Washington, DC, 1994; pp. 352-369.

(Continued)

Primary Examiner—Philip C. Tucker
(74) Attorney, Agent, or Firm—Vincent P. Loccisano; Jody Lynn DeStefanis; Dale Gaudier

(57) ABSTRACT

A controlled-gelation aqueous solution is proposed. The solution contains a hydrophobically-aggregating gelling agent, and an effective amount of an inhibitor which suppresses hydrophobic aggregation of the gelling agent. The inhibitor is soluble in water so that when the controlled-gelation aqueous solution contacts aqueous media the inhibitor disperses and gelation occurs. However, the inhibitor is substantially insoluble in hydrocarbons so that when the controlled-gelation aqueous solution contacts hydrocarbon media the inhibitor continues to suppress said hydrophobic aggregation and gelation is suppressed. The solution may be used to control the flow of water into oil wells, making it possible to reduce the water cut.

6 Claims, 2 Drawing Sheets

OTHER PUBLICATIONS

Hoffmann H. and Ebert G., "Surfactants, micelles and fascinating phenomena", Angew. Chem. Int. Ed. Engl. 27 (1988) 902-912.

Bailley B., Crabtree M., Tyrie J., Elphick J., Kuchuk F., Romano C., Roodhart L., "Water Control" Oilfield Review Spring 2000, p. 30-51.

Bock J., Valint P.L., Jr., Pace S.J., Siano D.B., Schulz D.N., Turner S.R. Hydrophobically associating polymers. In Water-Soluble Polymers for Petroleum Recovery; Stahl G.A., Schulz D.N., Eds.; Plenum Press: New York, 1988; pp. 147-160.

Regaldo E.J., Selb J., Candau F. Viscoelastic behavior of semidulute solutions of multisticker polymer chains. Macromolecules 1999, v. 32, pp. 8580-8588.

Chassenieux C., Fundin J., Ducouret G., Iliopoulos I. Amphiphilic copolymers of styrene with a surfactant-like comonomer: gel formation in aqueous solution. J. Molecular Structure 2000, v. 554, pp. 99-108.

Rehage H., Hoffman H. Viscoelastic surfactant solutions: model systems for rheological research. Mol. Phys. 1991, v. 74, pp. 933-973.

Raghavan S.R., Kaler E.W. Highly viscoelastic wormlike micellar solutions formed by cationic surfactants with long unsaturated tails. Langmuir 2001, v. 17, pp. 300-306.

Iliopoulos I., Wang T.K., Audebert R. Viscometric evidence of interactions between hydrophobically modified poly(sodium acrylate) and sodium dodecyl sulfate. Langmuir 1991, v. 7, pp. 617-620.

Sarrazin-Cartalas A., Iliopoulos I., Audebert R., Olsson U. Association and thermal gelation in mixtures of hydrophobically modified polyelectrolytes and non-ionic surfactants. Langmuir 1994, v. 10, pp. 1421-1426.

Piculell L., Thuresson K., Ericsson O. Surfactant binding and micellisation in polymer solutions and gels: binding isotherms and their consequences. Faraday Discussions 1995, v. 101, pp. 307-318.

Noda T., Morishima Y. Hydrophobic association of random copolymers of sodium 2-(acrylamido)-2-methylpropanesulfonate and dodecyl methacrylate in water as studied by fluorescence and dynamic light scattering. Macromolecules 1999, v. 32, pp. 4631-4640.

Blagodatakikh I.V., Sutkevich M.V., Sitnikova N.L., Churochkina N.A., Pryakhina T.A., Philippova O.E., Khokhlov A.R. Polymers with strongly interacting groups. Molecular weight characterization using GPC/LS. J. Chromatography, in press, (2002).

Khandurina Yu. V., Rogacheva V.B., Zezin A.B., Kabanov V.A. Stablilty of Polycomplexes of Cross-Linked Polyelectrolytes with Surfactants in Aqueous Salt and Aqueous Organic Media. Polymer Science. V. 36, No. 2, 1994, pp. 195-199 translated from Vysokomolekulyarnye Soedineniya. vol. 36, No. 2, 19994, pp. 241-246.

* cited by examiner

GELABLE LIQUID AND METHOD FOR SELECTIVELY INHIBITING THE GELATION OF A GELABLE LIQUID

FIELD OF THE INVENTION

The present invention relates to a gelable liquid which is capable of selective gelation depending on the type of medium (aqueous or hydrocarbon) with which it is in contact. The present invention also relates to a method for selectively inhibiting the gelation of a gelable liquid.

BACKGROUND OF THE INVENTION

In most oil wells, water enters the well and is recovered together with the oil. Furthermore, as the well ages the amount or cut of recovered water generally increases. On average, about 3 tons of water per one ton of oil are pumped out of depleting oil formations [1]. The size of the water cut produced by the well has a substantial effect on the economics of well operation.

Thus methods for limiting water inflow have been developed. These make it possible to reduce substantially the cost of oil recovery and to increase the amount of oil extracted from the formation.

One method of limiting the inflow of water involves the injection into the well of liquids capable of selectively reducing the flow of water without impeding the flow of oil [2]. Ideally, during injection into the well the liquid has a relatively low viscosity. Subsequently the liquid should form a gel "plug" in those zones of the well from which there is an inflow of water, but gelation should not occur upon contact of the liquid with oil.

The active component of gelable liquids can be provided by hydrophobically associating substances which are capable of forming physical gels in aqueous media [2, 3]. Such substances may be e.g. hydrophobically modified polymers, viscoelastic surfactants and polymer/surfactant complexes [2, 3].

The formation of physical gels from hydrophobically modified polymers is described in papers [4–6]. The formation of physical gels from viscoelastic surfactants is described in papers [7–9]. Gelation in polymer/surfactant complexes is described in papers [10–12].

A problem associated with gelable liquids intended to have selective placement capability and based on hydrophobically associating substances is that these substances tend to form physical gels immediately after being introduced to water. It is then difficult to pump the liquid into the well because formation of a physical gel has already commenced, increasing the viscosity of the system. Another problem is that contact between the physical gel and hydrocarbons may not result in destruction of the gel, leading to plugging of oil-bearing formations. The latter problem is particularly associated with gels formed by hydrophobically modified polymers. Thus it would be desirable to be able to: (1) sufficiently slow down the process of gelation in aqueous media such that the gelable liquid has a low viscosity during injection, (2) nonetheless form a gel downhole on contact between the liquid and water, and (3) suppress gelation on contact between the liquid and oil.

Several methods for slowing gelation have been proposed for gelable liquids comprising viscoelastic surfactants [3]. However, as far as the present inventors are aware, methods for controlling the speed of formation of physical gels in gelable liquids comprising hydrophobically modified polymers are largely undeveloped.

As is shown in papers [13–15] from other technical fields, hydrophobic aggregates formed in diluted solutions of hydrophobically modified polymers and polymer/surfactant complexes may be destroyed in water-organic mediums. For example, it is shown in papers [13, 14] that in dilute solutions of hydrophobically modified polyacrylamide, the hydrophobic aggregates are destroyed when 20–50 vol. % of acetonitrile is added to the water. This solvent is used during the determination of the molecular weight of individual macromolecules by gel-permeation chromatography (GPC). Similar behaviour is observed in polymer/surfactant complexes. Paper [15] discloses that in water/ethanol and water/isopropanol mixtures, containing 40–50 vol. % of alcohol, destruction of the polymer/surfactant complexes takes place because of a weakening of hydrophobic interactions.

SUMMARY OF THE INVENTION

The present invention is at least partly based on the recognition that a similar approach can be used to control the formation of physical gels in polymer-containing gelable liquids, with the aims of (1) slowing down the process of gelation in an aqueous medium and (2) suppressing gelation upon contact with hydrocarbons.

In a first aspect, the present invention provides a controlled-gelation aqueous solution containing:
  a hydrophobically-aggregating gelling agent, and
  an effective amount of an inhibitor which suppresses hydrophobic aggregation of the gelling agent, the inhibitor being soluble in water so that when the controlled-gelation aqueous solution contacts aqueous media the inhibitor disperses and gelation occurs, and the inhibitor further being substantially insoluble in hydrocarbons so that when the controlled-gelation aqueous solution contacts hydrocarbon media the inhibitor continues to suppress said hydrophobic aggregation and gelation is suppressed.

A further aspect of the present invention provides for the use of the controlled-gelation aqueous solution of the previous aspect as a hydrocarbon well service fluid.

In a further aspect, the present invention provides a method of forming a controlled-gelation solution, the method comprising:
  providing an aqueous solution containing a hydrophobically-aggregating gelling agent, and
  introducing into the aqueous solution an effective amount of an inhibitor which suppresses hydrophobic aggregation of the gelling agent, the inhibitor being soluble in water so that when the aqueous solution contacts aqueous media the inhibitor disperses and gelation occurs, and the inhibitor further being substantially insoluble in hydrocarbons so that when the aqueous solution contacts hydrocarbon media the inhibitor continues to suppress said hydrophobic aggregation and gelation is suppressed.

Yet another aspect of the present invention provides a method for selectively blocking water inflow from a water-producing formation of a hydrocarbon well, the method comprising:
  injecting into the well a controlled-gelation aqueous solution containing (a) a hydrophobically-aggregating gelling agent and (b) an effective amount of an inhibitor which suppresses hydrophobic aggregation of the gelling agent and which is soluble in water but substantially insoluble in hydrocarbons,
  whereby when the controlled-gelation aqueous solution contacts a hydrocarbon-producing formation the inhibitor continues to suppress said hydrophobic aggregation so that gelation is suppressed, and when the controlled-gelation aqueous solution contacts a water-producing formation the inhibitor disperses so that gelation occurs and the formation is blocked.

Preferably, the aqueous solution of any one of the previous aspects contains 1 to 10 wt % of the gelling agent.

The gelling agent may be a water-soluble co-polymer comprising hydrophilic and hydrophobic monomer units.

The aqueous solution may further contain a surfactant which forms a complex with the water-soluble co-polymer.

The present invention provides in a further aspect a method for selectively inhibiting the gelation of an associating gelling liquid comprising hydrophobically associating substances, which are hydrophobically modified water-soluble polymers or complexes of such polymers with a surfactant, the method ensuring, in the case of contact of the gelling liquid with hydrocarbon media, maintenance of the inhibiting effect so gelation does not take place, while, in the case of contact of the gelling liquid with aqueous media, disappearance of the inhibiting effect so that gelation takes place, the method comprising introducing an inhibitor into the liquid prior to bringing it into contact with said media, the inhibitor suppressing the hydrophobic association of hydrophobically associating substances, and being soluble in aqueous media but substantially insoluble in hydrocarbon media.

An aqueous associating gelling liquid capable of selective gelation is provided in a further aspect of the invention, the liquid comprising:

1–10 wt. % of hydrophobically associating substances which are hydrophobically modified water-soluble polymers or complexes of such polymers and a surfactant, and an effective amount of a gelation inhibitor, wherein the inhibitor suppresses hydrophobic association of the hydrophobically associating substances, and dissolves in aqueous media but is substantially insoluble in hydrocarbon media.

Another aspect of the invention provides a composition for treatment of an oil well, the composition including an aqueous associating gelling liquid that is capable of selective gelation, the liquid comprising:

hydrophobically associating substances which are hydrophobically modified water-soluble polymers or complexes of the aforesaid polymers with a surfactant, and an effective amount of a gelation inhibitor, wherein the inhibitor suppresses hydrophobic association of hydrophobically associating substances, and dissolves in aqueous media but is substantially insoluble in hydrocarbon media.

Yet another aspect of the present invention provides a method for selectively blocking water inflow into an oil producing well from underground water-bearing formations, the method comprising:

pumping the composition described above for treatment of an oil well into the well bore, whereby the associating gelling liquid of the composition forms blocking gel plugs only in those places of the well where the gelling liquid is in contact with an aqueous medium and does not form plugs in places of contact between the associating liquid and oil.

Thus the invention may be used in the oil producing industry to limit the inflow of water into an oil producing well while maintaining the oil inflow substantially unchanged.

The associating gelling liquid and method for selectively inhibiting the gelation of such a liquid, make it possible to control the rate of formation of a physical gel so that the process of gelation is dependent on the type of medium (water or hydrocarbon) the gelling liquid is in contact with.

The inhibitor suppresses hydrophobic association of the hydrophobically associating substances in the liquid, and has good solubility in water but is poorly soluble in hydrocarbons. In this way, when the associating gelling liquid comes into contact with water, the concentration of the inhibitor in the gelling liquid falls as the inhibitor passes from the gelling liquid into the water. This causes gelation of the liquid, which had previously been suppressed by the inhibitor. On the other hand, when the gelling liquid comes into contact with hydrocarbons, gelation does not take place as the inhibitor is insoluble in hydrocarbons and remains in the liquid.

In one embodiment of any one of the previous aspects, the inhibitor is an organic solvent.

Organic solvents may be classified according to their polarity, that is, their permanent dipole moment. Examples of moderately polar solvents include methanol, ethanol etc. Examples of relatively non-polar solvents include Dichloromethane, tetrahydrofuran, and ethyl acetate. Examples of non-polar solvents include alkanes, benzene, toluene, and carbon tetrachloride.

Preferably, the organic solvent is moderately polar, such that it mixes with water but is insoluble in hydrocarbons.

Thus the solvent may be methanol, ethanol, etc., or a mixture thereof. Preferably, the solvent is ethanol.

In another embodiment of any one of the previous aspects, the gelling liquid comprises, as a hydrophobically associating substance, a hydrophobically modified water-soluble polymer based on polyacrylamide, having 84.4 mol. % of acrylamide units, 1.5 mol. % of n-dodecylacrylamide units and 14.1 mol. % of sodium acrylate units, wherein the polymer is obtained by the method of micellar polymerization with a sodium dodecylsulfate concentration of 1.5 wt. % and a total concentration of the monomers of 3.0 wt. %. Additionally, a solution of cetylpyridinium chloride surfactant may be added to the gelling liquid in the amount of 70 µl of the surfactant solution with a concentration of 0.02 mol/l per 4 ml of the gelling liquid.

In another embodiment of any one of the previous aspects, the gelling liquid comprises, as a hydrophobically associating substance, a hydrophobically modified water-soluble polymer based on polyacrylamide, having 88.8 mol. % of acrylamide units, 1.5 mol. % of n-dodecylacrylamide units and 9.7 mol. % of sodium acrylate units, wherein the polymer is obtained by the method of micellar polymerization with a sodium dodecylsulfate concentration of 3.0 wt. % and a total concentration of the monomers of 3.0 wt. %.

DETAILED DESCRIPTION OF THE INVENTION

Figure 1:
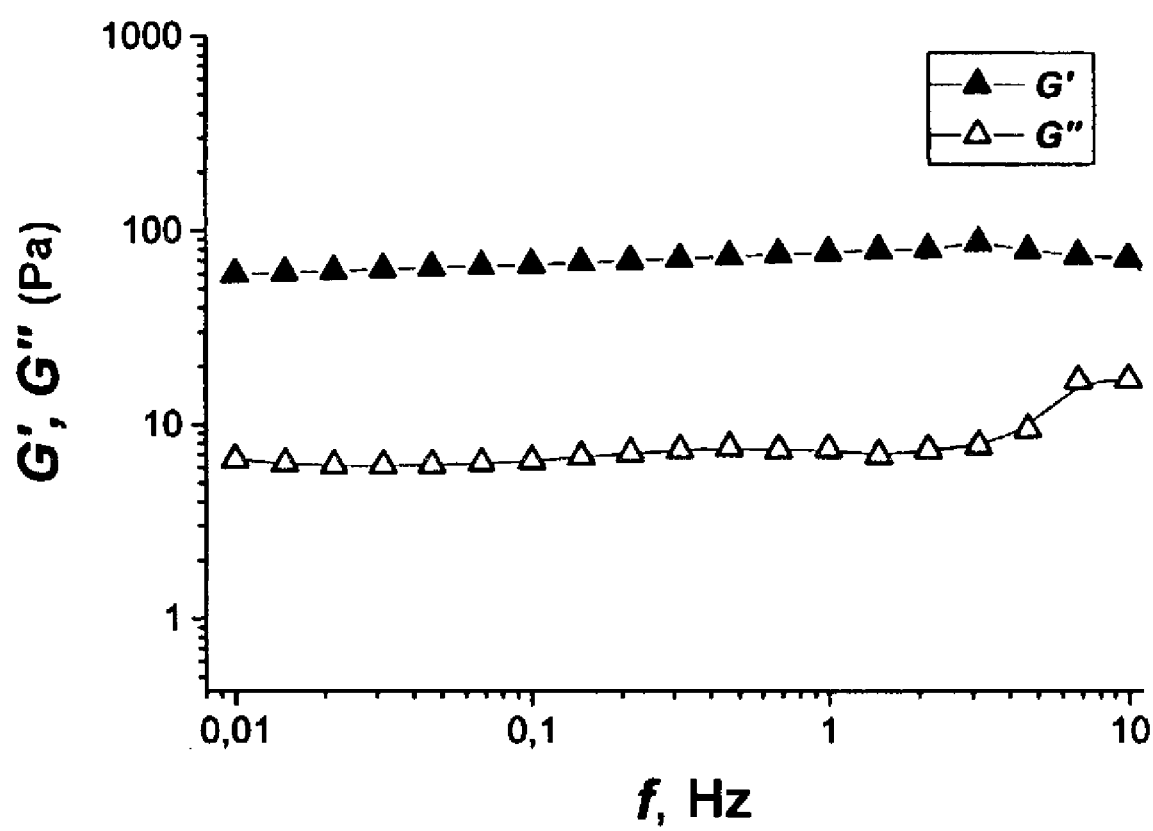
FIG. 1 shows the frequency relationship of the components of the complex modulus of elasticity of the polymer solution of Example 1 when in contact with an aqueous medium.

In order for the physical gel formed by the controlled-gelation solution of the present invention to have sufficient mechanical properties, hydrophobically modified polymers may be used as the gelling agent. In one embodiment these polymers are water-soluble co-polymers comprising hydrophilic and hydrophobic monomer units.

The hydrophobically modified polymers should comprise a sufficient amount of groups with pronounced hydrophobic properties, which groups are capable of providing reliable cross-linkage of the polymer chains by forming hydrophobic aggregates, or complexes of such hydrophobically associating polymers with a surfactant. One of the possible types of hydrophobically modified polymers is based on polyacrylamide and has the following formula:

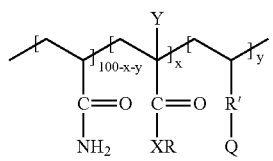

wherein R is a $C_{5-20}$ (preferably $C_{7-15}$) saturated or unsaturated aliphatic alkyl group, X is —O— or —NH—, and Y is —H or —CH$_3$. Typically R is saturated. Typically R is linear. In one embodiment, R is a —(CH$_2$)$_n$CH$_3$ group where n is 8 or 11. x may be in the range 0.5 to 5 (preferably 1 to 3), and y may be in the range 2 to 25 (preferably 5 to 15). The "x" monomer unit is hydrophobic and the "y" monomer unit is hydrophilic. Q is a group which forms charged species in aqueous solution. For example, Q may be a carboxylate, sulphate, sulphonate, monophosphate, monophosphonate, xanthate, or ammonium group. The group may be in the form of a salt or the corresponding acid/base. The ammonium group may be primary, secondary, tertiary or quaternary ammonium group. In one embodiment Q is a —COONa group, although the Na atom can be replaced by a hydrogen atom, a different alkali metal, such as K, or any other suitable cation-forming species. R' links Q to the polymer backbone chain. R' may be a covalent bond or a relatively small organic (preferably hydrocarbyl) group, e.g. one containing 1, 2, 3, 4 or 5 carbon atoms. Preferably R' is a covalent bond. However, in one embodiment, R' is a —NH—C(CH$_3$)$_2$—CH$_2$— group, with the —NH— group being connected to the polymer backbone chain and the —CH$_2$— group being connected to Q which is e.g. a sulphonate group.

The proposed associating gelling liquid (which may be a controlled-gelation aqueous solution) and method for selectively inhibiting gelation of the gelling liquid may be used for the selective blocking of the inflow of water into an oil-producing well from subterranean water-bearing formations while maintaining the flow of oil unchanged. The inhibitor makes it possible to suppress hydrophobic association which is responsible for gelation. Therefore, prior to and as the liquid is pumped into the well, the viscosity of the liquid is insignificant, which facilitates handling and placement of the liquid.

Furthermore, the presence of the inhibitor in the gelling liquid can improve the wettability of the liquid with downhole formations, which promotes more effective penetration of the liquid into the "working section" of the oil producing well.

After a period of time, the liquid forms blocking gel plugs at those places in the well where the liquid is in contact with aqueous media. However, at places of contact between the liquid and oil, gelation continues to be suppressed by the inhibitor and gel plugs are not formed.

The invention is further illustrated by the following non-limitative examples.

EXAMPLE 1

0.2 g of terpolymer I comprising 84.4 mol. % of acrylamide, 1.5 mol. % of n-dodecylacrylamide and 14.1 mol. % of sodium acrylate, synthesized by the method of micellar polymerization with a concentration of sodium dodecylsulfate of 1.5 wt. % and a total concentration of the monomers of 3.0 wt. %, was dissolved in 10 ml of a mixture of ethanol (60 vol. %) and water (40 vol. %) with continuous stirring for 2 hours. In order to model the contact of the polymer solution with formation water, 1 ml of the ready polymer solution was added to 20 ml of an aqueous salt solution containing 30 g/l of sodium chloride and 3 g/l of calcium chloride. In order to model the contact with oil, 1 ml of the polymer solution was added to 20 ml of n-heptane.

Figure 2:
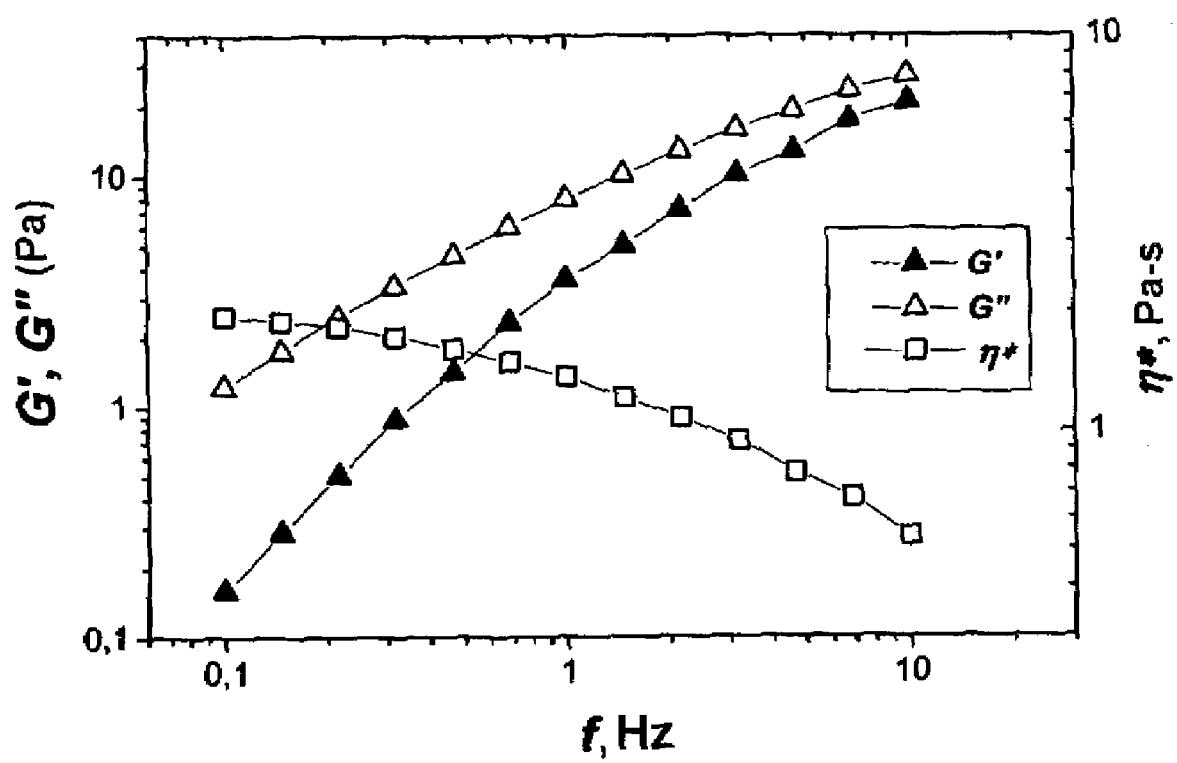
FIG. 2 shows the frequency relationship of the components of the complex modulus of elasticity of the polymer solution according to Example 1 when in contact with a hydrocarbon.

After two weeks the frequency relationships of the complex modulus of elasticity of the polymer solutions in contact with the aqueous salt solution and the n-heptane were measured. These are presented in FIG. 1 and FIG. 2. For the sample in contact with water, the modulus of elasticity in the frequency range of from 0.01 to 10 Hz was higher than the modulus of losses, i.e., the sample was a physical gel. In contrast, for the sample in contact with the n-heptane, the modulus of elasticity in the frequency range of from 0.01 to 10 Hz was lower than the modulus of losses, i.e., in this sample gelation did not take place. The values of the modulus of elasticity measured at a frequency of 0.1 Hz, and also the viscosity of the initial polymer solution, are presented in Table 1.

EXAMPLE 2

0.060 g of terpolymer I (composition as defined in Example 1) was dissolved in 3.8 ml of a mixture of methanol (53 vol. %) and water (47 vol. %). The change of the rheological properties of the solution upon contact with an aqueous salt solution and n-heptane was studied in the same way as described above in relation to Example 1. The measurement data are presented in Table 1.

EXAMPLE 3

0.3 g of terpolymer II comprising 88.8 mol. % of acrylamide, 1.5 mol. % of n-dodecylacrylamide and 9.7 mol. % of sodium acrylate, synthesized by the method of micellar polymerization with a concentration of sodium dodecylsulfate of 3.0 wt. % and a total concentration of the monomers of 3.0 wt. %, was dissolved in 10 ml of a mixture of ethanol (40 vol. %) and water (60 vol. %) with continuous stirring for 2 hours. The change of the rheological properties of the solution upon contact with an aqueous salt solution and n-heptane was studied in the same way as described above in relation to Example 1. The measurement data are presented in Table 1.

EXAMPLE 4

A gelling mixture based on terpolymer I was prepared as described in Example 1, with the exception that 70 μl of a 0.020 mol/l aqueous solution of the surfactant cetylpyridinium chloride was additionally added to 4 ml of the mixture. The change of the rheological properties of the solution upon contact with an aqueous salt solution and n-heptane was studied in the same way as described above in relation to Example 1. The measurement data are presented in Table 1.

TABLE 1

Comparison of moduli of elasticity of example samples after contact with an aqueous medium and with n-heptane.

| Example | Viscosity of initial solution, Pa · s | G' of sample at frequency of 0.1 Hz, Pa | |
|---|---|---|---|
| | | Contact with aqueous medium | Contact with n-heptane |
| 1 | 0.13 | 67 | 0.16 |
| 2 | 0.52 | 5.3 | 0.36 |
| 3 | 0.33 | 23 | 0.47 |
| 4 | 0.18 | 12.0 | 0.85 |

Thus, similar results (the formation of a physical gel upon contact with water and the absence of gelation upon contact with n-heptane) are obtained for different hydrophobically modified polymers, and also for hydrophobically modified polymer/surfactant complexes, in the presence of different inhibitors.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

REFERENCES

All references mentioned herein are incorporated by reference.
1. Bailley B., Crabtree M., Tyrie J., Elphick J., Kuchuk F., Romano C., Roodhart L., Water Control. In Oilfield Review, Spring 2000, pp. 30–51.
2. Patent WO 99/49183 of Sep. 30, 1999.
3. Patent U.S. Pat. No. 6,194,356 B1 of Feb. 27, 2001.
4. Bock J., Valint P. L., Jr., Pace S. J., Siano D. B., Schulz D. N., Turner S. R. Hydrophobically associating polymers. In Water-Soluble Polymers for Petroleum Recovery; Stahl G. A., Schulz D. N., Eds.; Plenum Press: New York, 1988; pp. 147–160.
5. Regalado E. J., Selb J., Candau F. Viscoelastic behavior of semidulute solutions of multisticker polymer chains. Macromolecules 1999, V. 32, pp. 8580–8588.
6. Chassenieux C., Fundin J., Ducouret G., Iliopoulos I. Amphiphilic copolymers of styrene with a surfactant-like comonomer: gel formation in aqueous solution. J. Molecular Structure 2000, V. 554, pp. 99–108.
7. Rehage H., Hoffman H. Viscoelastic surfactant solutions: model systems for rheological research. Mol. Phys. 1991, V. 74, pp. 933–973.
8. Hoffman H. In Structure and Flow in Surfactant Solutions; ACS Symp. Ser. 578; Herb C. A., Prudhomme R., Eds. American Chemical Society: Washington, D.C., 1994; pp. 2–31.
9. Raghavan S. R., Kaler E. W. Highly viscoelastic wormlike micellar solutions formed by cationic surfactants with long unsaturated tails. Langmuir 2001, V. 17, pp. 300–306.
10. Iliopoulos I., Wang T. K., Audebert R. Viscometric evidence of interactions between hydrophobically modified poly(sodium acrylate) and sodium dodecyl sulfate. Langmuir 1991, V. 7, pp. 617–620.
11. Sarrazin-Cartalas A., Iliopoulos I., Audebert R., Olsson U. Association and thermal gelation in mixtures of hydrophobically modified polyelectrolytes and non-ionic surfactants. Langmuir 1994, V. 10, pp. 1421–1426.
12. Piculell L., Thuresson K., Ericsson O. Surfactant binding and micellisation in polymer solutions and gels: binding isotherms and their consequences. Faraday Discussions 1995, V. 101, pp. 307–318.
13. Noda T., Morishima Y. Hydrophobic association of random copolymers of sodium 2-(acrylamido)-2-methylpropanesulfonate and dodecyl methacrylate in water as studied by fluorescence and dynamic light scattering. Macromolecules 1999, V. 32, pp. 4631–4640.
14. Blagodatskikh I. V., Sutkevich M. V., Sitnikova N. L., Churochkina N. A., Pryakhina T. A., Philippova O. E., Khokhlov A. R. Molecular mass characterization of polymers with strongly interacting groups using gel permeation chromatography—light scattering detection. J. Chromatography A 2002, V. 976, pp. 155–164.
15. Khandurina Yu. V., Rogacheva V. B., Zezin A. V., Kabanov V. A. Stability of Polycomplexes of Cross-Linked Polyelectrolytes with Surfactants in Aqueous Salt and Aqueous Organic Media. Polymer Science. 1994, V. 36, No. 2, pp. 195–199. Translated from Vysokomolekulyarnye Soedineniya. 1994, V. 36, No. 2, pp. 241–246.

What is claimed is:

1. A method of forming a controlled-gelation solution, the method comprising:
providing an aqueous solution containing 1,5 to 10 wt % of a hydrophobically-aggregating gelling agent which is a water-soluble co-polymer comprising hydrophilic and hydrophobic monomer units, the aqueous solution further containing a surfactant which forms a complex with the water-soluble co-polymer, and
introducing into the aqueous solution an effective amount of an inhibitor which suppresses hydrophobic aggregation of the gelling agent, the inhibitor being soluble in water so that when the aqueous solution contacts aqueous media the inhibitor disperses and gelation occurs, and the inhibitor further being substantially insoluble in hydrocarbons so that when the aqueous solution contacts hydrocarbon media the inhibitor continues to suppress said hydrophobic aggregation and gelation is suppressed.

2. A method according to claim 1, wherein the water-soluble co-polymer has the formula:

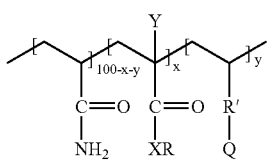

and wherein:
R is a C5.20 saturated or unsaturated aliphatic alkyl group,
X is —O— or —NH—, Y is —H or —CH$_3$,
Q is a group which forms charged species in aqueous solution, and R' is a covalent bond or a relatively small organic group containing 1, 2, 3, 4 or 5 carbon atoms.

3. A method according to claim 1, wherein the inhibitor is an organic solvent.

4. A controlled-gelation aqueous solution containing:
1,5 to 10 wt % of a hydrophobically-aggregating gelling agent which is a water-soluble copolymer comprising hydrophilic and hydrophobic monomer units, a surfactant which forms a complex with the water-soluble co-polymer., and an effective amount of an inhibitor which suppresses hydrophobic aggregation of the gelling agent, the inhibitor being soluble in water so that when the controlled-gelation aqueous solution contacts aqueous media the inhibitor disperses and gelation occurs, and the inhibitor further being substantially insoluble in hydrocarbons so that when the controlled-gelation aqueous solution contacts hydrocarbon media the inhibitor continues to suppress said hydrophobic aggregation and gelation is suppressed.

5. A controlled-gelation aqueous solution according to claim 4, wherein the water-soluble co-polymer has the formula:

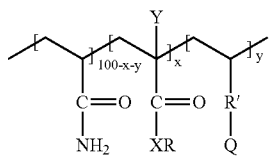

and wherein:
R is a C5.20 saturated or unsaturated aliphatic alkyl group, X is
—O— or —NH—, Y is —H or —CH$_3$,
Q is a group which forms charged species in aqueous solution, and R' is a covalent bond or a relatively small organic group containing 1, 2, 3, 4 or 5 carbon atoms.

6. A controlled-gelation aqueous solution according to claim 4, wherein the inhibitor is an organic solvent.

* * * * *